Figure 1:
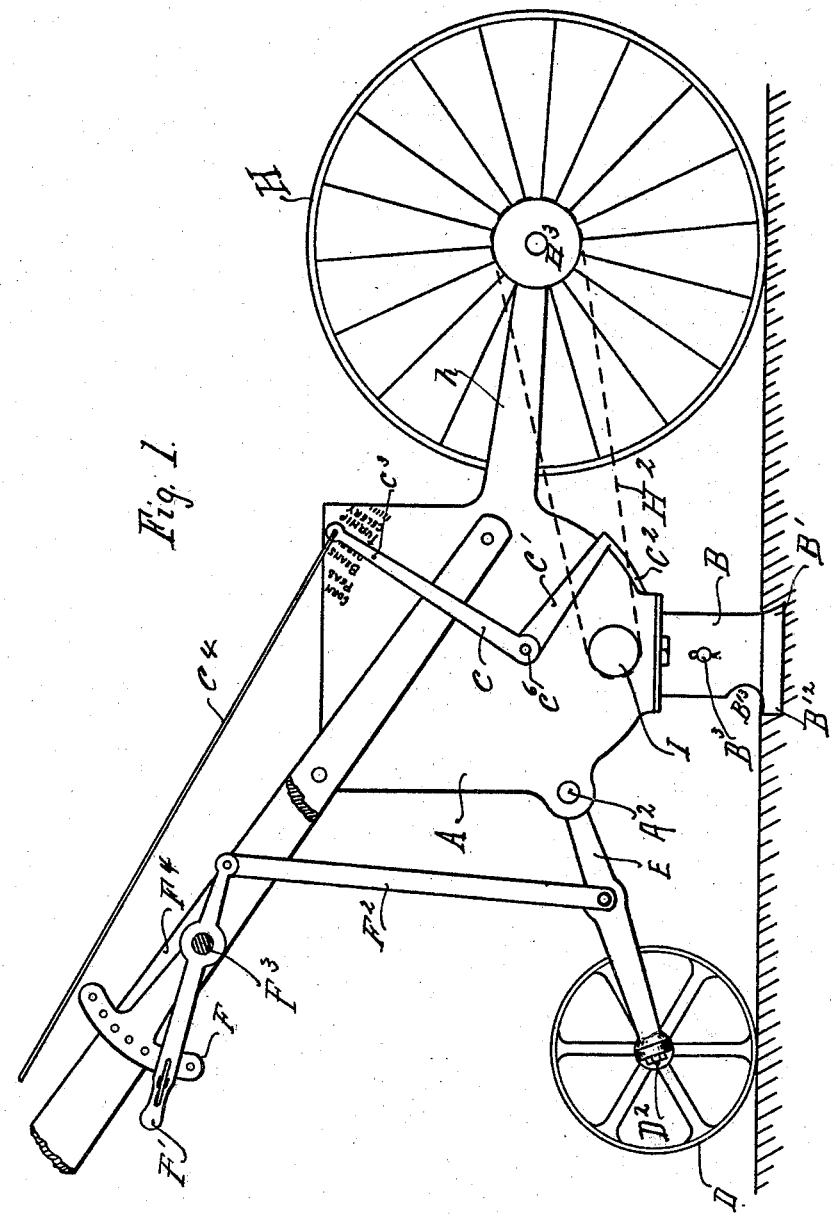

No. 611,650. Patented Oct. 4, 1898.
G. L. ROBY.
SEEDING MACHINE.
(Application filed Feb. 3, 1898.)

(No Model.) 3 Sheets—Sheet 1.

Witnesses:
J. P. Armistead.
Geo. R. Wyman.

Inventor:
Geo. L. Roby

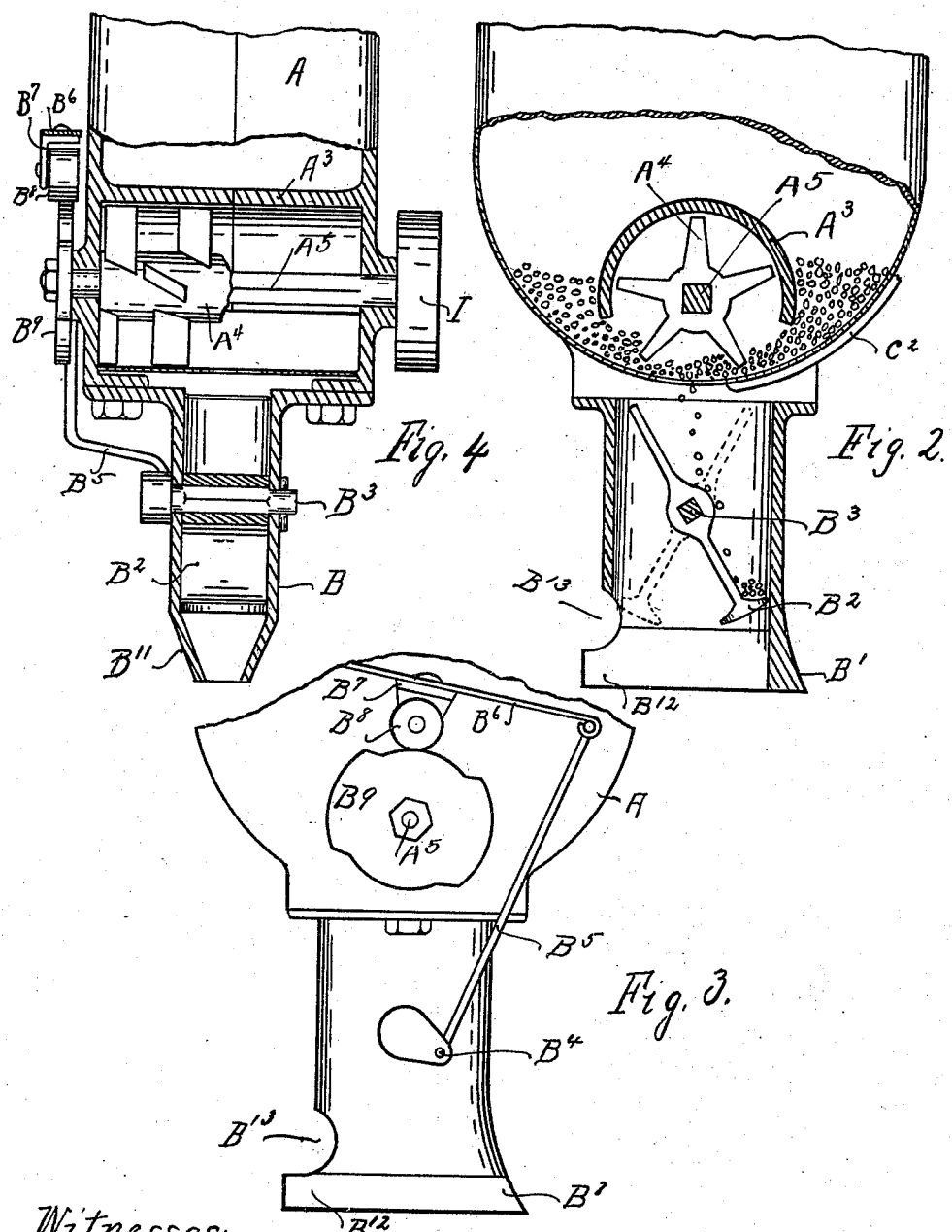

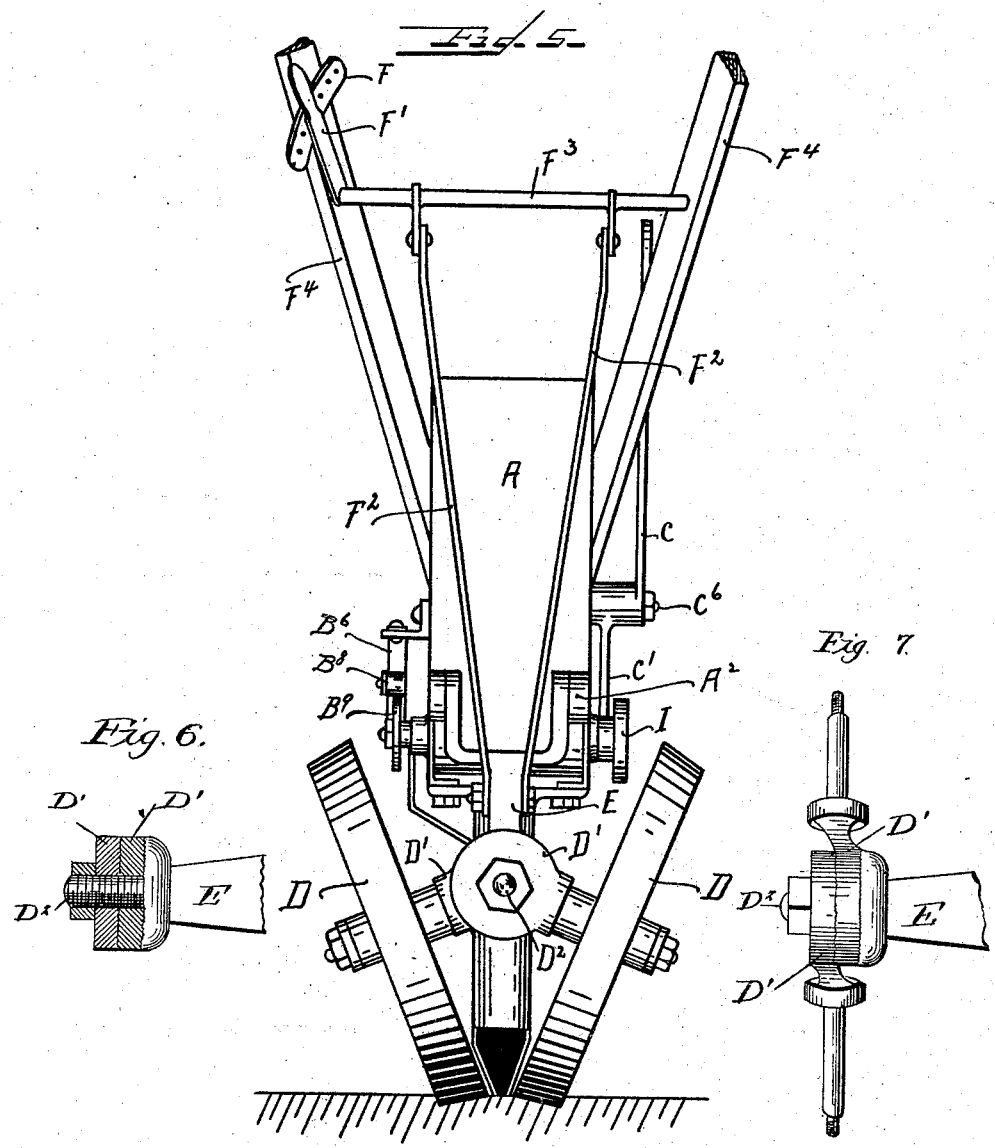

UNITED STATES PATENT OFFICE.

GEORGE L. ROBY, OF GRAND HAVEN, MICHIGAN, ASSIGNOR TO THE GALE MANUFACTURING COMPANY, OF ALBION, MICHIGAN.

SEEDING-MACHINE.

SPECIFICATION forming part of Letters Patent No. 611,650, dated October 4, 1898.

Application filed February 3, 1898. Serial No. 668,918. (No model.)

*To all whom it may concern:*

Be it known that I, GEORGE L. ROBY, a citizen of the United States, residing at Grand Haven, in the county of Ottawa and State of Michigan, have invented certain new and useful Improvements in Seeding-Machines; and I do hereby declare that the following is a full, clear, and exact description of the invention, such as will enable others skilled in the art to which it appertains to make and use the same.

My invention consists in the novel features hereinafter described, reference being had to the accompanying drawings, which illustrate one form in which I have contemplated embodying my invention, and said invention is fully disclosed in the following description and claims.

In the said drawings, Figure 1 is a side elevation of a seeding-machine embodying my invention, the handles being broken away and only one covering-wheel being shown in position. Fig. 2 is a sectional view of the seed-hopper and delivery plow or spout. Fig. 3 is an exterior view of the same, showing the operating devices for the vibrating valve in said spout or plow. Fig. 4 is a transverse sectional view of the hopper and plow or spout. Fig. 5 is a rear elevation of the machine with parts broken away. Figs. 6 and 7 are detail views showing the arrangement for connecting the axles of the rear or covering wheels and adjusting the same.

In the drawings, A represents the seed-hopper, having a semicylindrical bottom portion provided with a delivery-aperture. To the bottom of the hopper is secured the delivery spout or plow B, which extends downwardly from the hopper and is open at the bottom. The plow or spout B is provided at the front and bottom with a nose B', which performs the functions of an ordinary opening-plow. In rear of this nose the bottom portions of the side walls of the plow are bent inwardly to prevent the soil from packing therein, said inwardly-bent portions being indicated at $B^{12}$. The said portions $B^{12}$ are extended rearwardly of the plow and are open in the rear, and a portion of the plow above the said portions $B^{12}$ is cut away, as shown at $B^{13}$, to enable the operator to look into the plow from the rear and observe the dropping of the seed.

Within the hopper A is a curved shield $A^3$, disposed transversely of the hopper above the delivery-aperture and having its lower edges closely adjacent to the curved hopper-bottom, so that the seed must pass beneath these edges to reach the said aperture. Beneath the shield is an agitator $A^4$, consisting in this instance of a hub provided with a squared longitudinal opening therethrough and radial agitating-arms set spirally therein, as shown. This stirrer is carried by a shaft $A^5$, having a squared portion passing through the hub of the agitator, said shaft being mounted in the walls of the hopper, so as to bring the agitator directly over the delivery-aperture. The shield $A^3$ will serve to keep the weight of the seed off of the agitator and leave it free to rotate to bring the seed passing beneath the shield to the delivery-aperture.

The hopper A is provided in front with a supporting-wheel H, in this instance journaled in forwardly-extending arms $h$, and in rear of the hopper is a frame or bar E, pivoted to the hopper at $A^2$ and provided at its rear end with a pair of covering and depth-regulating wheels D D. I prefer to connect these wheels adjustably, as shown in Figs. 5, 6, and 7. The bar E is provided with a shoulder, beyond which extends a longitudinally-disposed pivot or spindle $D^2$, having a threaded portion at its outer end.

D' D' represent two independent adjustable axles having perforated portions engaging the pivot or spindle $D^2$. The adjacent surfaces of the perforated portions of the axles and the shoulder on frame or bar E will preferably be roughened or serrated, as shown, in a well-known way. The wheels D D are mounted on the adjustable axles D' D' and can be set at different angles and clamped in any desired position by means of a nut on the spindle $D^2$.

The hopper A is provided with suitable handles $F^4$, to which is secured a rock-shaft F³, provided with arms which are connected by links F² to the bar or frame E. One of the handles F⁴ is also provided with a perforated segment F, and the rock-shaft F³ is provided adjacent to said plate with an operating-lever F', having a locking-pawl to engage said segment, and by this construction the rear wheels D D can be raised or lowered with respect to the hopper and held in any desired position, thereby adjusting the depth of the plow or delivery-spout B.

The shaft of the front wheel H is provided with a driving-wheel H³, geared by means of a belt or equivalent device (indicated in dotted lines, Fig. 1) with a wheel or pulley I on the shaft A⁵ of the agitator, so that the latter will be rotated as the planter moves forward.

I also provide a removable valve for the plow or spout B for dropping the seed at intervals instead of continuously. B² represents the valve, which is of the form shown in Fig. 2, and has its central portion provided with a polygonal aperture, in this instance square, to receive a squared portion of the removable shaft B³, which is placed in engagement with suitable bearing-apertures in the plow and is provided at one end with an arm B⁴ and at the other with an aperture to receive a pin or cotter, as shown, to hold it in operative position. The arm B⁴ is connected by a link B⁵ to one end of a spring-arm B⁶, the other end of which (not shown) is firmly secured to the hopper or other part of the machine. To the spring-arm, between its ends, is secured a bracket B⁷, carrying a friction-roll B⁸, which rides on a cam B⁹, secured to rotate with the shaft A⁵ of the stirrer, so that as the machine advances the valve B² will be caused to vibrate in the plow or spout and thus deliver the seed intermittently. By removing the cotter from shaft B³ the said shaft and the valve can be removed from the plow and the seed can then be planted in drills.

In order to regulate the discharge of the seed from the hopper, I provide a sliding shoe or cut-off C², adapted to be moved over the hopper-bottom to close or partially close the delivery-aperture therein. This cut-off is carried on the outer end of an arm C', pivoted to the hopper at C⁶ and having a connected arm or lever C extending upward from the point of pivoting and connected to a link C⁴, extending to a point adjacent to the handles F⁴, so that by means of this link C⁴ the shoe or cut-off can be adjusted. The hopper will preferably be provided with indications adjacent to the arm or lever C³ to show the operator to what positions to adjust the cut-off to adapt the machine to different kinds of seed.

What I claim, and desire to secure by Letters Patent, is—

1. In a seeding-machine, the combination with the hopper, supporting-wheels connected thereto forward of said hopper and the hollow delivering spout or plow connected to said hopper, of a frame pivoted to the hopper and extending rearwardly thereof, depth-regulating wheels secured to said frame, handles secured to the hopper, an adjusting-lever on said handles, and connections from said lever to said pivoted frame, substantially as described.

2. In a seeding-machine, the combination with a hopper provided with a delivery-orifice, of a rotary agitating device in said hopper adjacent to said orifice, and a curved hood or shield above said agitating device and extending below the axis of rotation of the agitating device whereby the weight of the seed is supported by the hood and the seed passes beneath the lower edges of the hood to the agitator, substantially as described.

3. In a seeding-machine, the combination with a hopper provided with a discharge-orifice in its bottom and having its sides formed to guide the seed toward said orifice, of a rotary agitating device above said orifice, and a semicylindrical hood extending over said agitating device and having its lower horizontal edges adjacent to the bottom of the hopper whereby the weight of the seed is supported by said hood and the seed passes beneath the lower edges of said hood to the agitator, substantially as described.

4. In a seeding-machine, the combination with the hopper, of a delivery-plow having the lower portions of its side walls bent inwardly toward each other, to prevent the soil from packing therein, said portions of the side walls being extended rearwardly beyond the main body of the plow to permit the operator to observe the dropping of the seed, substantially as described.

5. In a seeding-machine, the combination with the hopper, of the delivery-plow having the lower portions of its side walls bent inwardly toward each other to prevent the soil packing therein, said inwardly-bent portions of the side walls being extended rearwardly beyond the main body of the plow, and the main body of the plow being cut away above said rearwardly-extended portions to allow the operator to observe the dropping of the seed, substantially as described.

6. In a seeding-machine the combination with the hopper provided with a rotary agitator-shaft and agitator and a cam on said shaft, of the delivery plow or spout, a removable oscillating-valve for said spout, and operative connections between said valve and said cam, substantially as described.

7. In a seeding-machine, the pressing-wheels each mounted upon an independent axle, each of said axles being pivoted to the frame of the machine by a pivot extending longitudinally thereof and means for adjusting said axles to vary the angular positions of said wheels with respect to each other, substantially as described.

8. In a seeding-machine, the combination with the frame provided with a longitudinally-extending horizontal pivot, of a pair of presser-wheels, each provided with an independent axle having a portion to engage said pivot and clamping means for securing said axle in adjusted positions about said pivot, substantially as described.

GEORGE L. ROBY.

Witnesses:
JACOB BAAR,
L. F. ROBY.